7866X
J. Reichard.
Cultivator.
Patented Dec. 16, 1833.
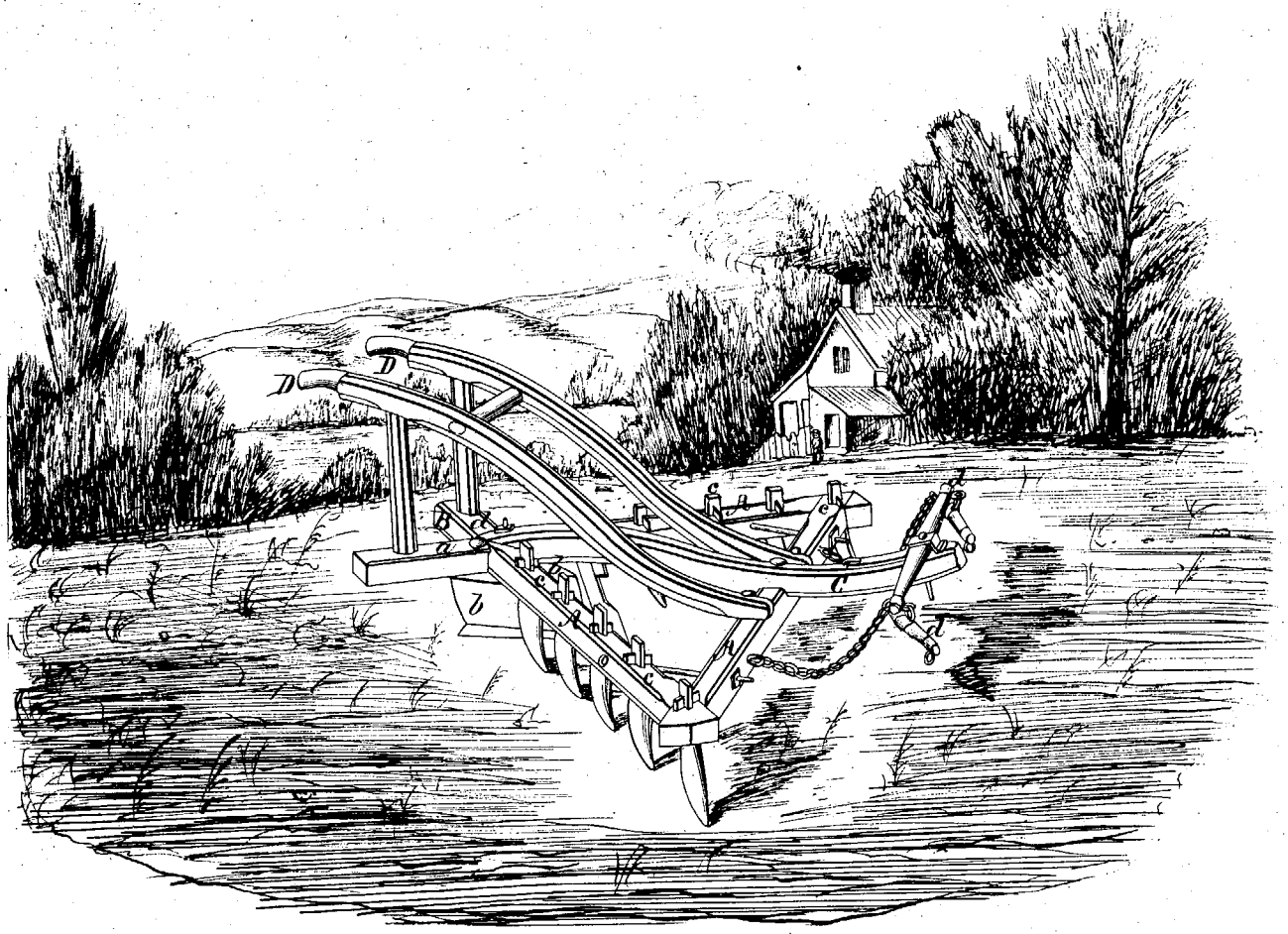

7866X

John Reichard Guilford Penn.

Letters Patent

The Schedule referred to in these Letters Patent and making part of
the same containing a description in the words of the said John Reichard
himself of his improvement in the seeding cultivator To all whom it may concern
Be it known that I, John Reichard of Guilford in the County of Frank-
lin and State of Pennsylvania have made certain improvements in the ag-
ricultural instrument used for the purpose of seeding in raising grain which
instrument as improved by me I denominate a Seeding Cultivator. And
I do hereby declare that the following is a full and exact description thereof
reference being had to the drawing which accompanies & makes a part
of this specification — I make a frame of three pieces of timber A A.
A each of which should be about seven feet long & about three inches
square. They are framed by being halved together at the three angles
in the manner shown in the drawing. The piece A is the front one
of the frame & this and the two side timbers are halved together at their
ends, but the two side timbers cross each other at the angle B at two feet
from their ends. The projecting part of these serve to receive the standards
C.C. which support the handles D.D. Immediately under the angle
formed at the back end and [illegible] forward of it is fixed a doub-
le or wedge formed mould board provided with a share and coulter and
bolted on to the frame timbers by two bolts, the ends of which are seen
at a.a. — The share and mould Board project forwardly towards
the front of the cultivator as seen at b.b. — In the sides A A I insert
ten teeth or shovels five on each side — They are made in the usual
form of cultivator teeth are about four inches wide [illegible] the face & extend
about eight inches below the frame. The shank which passes thro
the frame may be fastened by a nut or key as at c.c.c. The teeth
or shovels are placed at right angles with the sides which [illegible] to them

[illegible]

396. 7866X the proper slope as the machine is drawn forward. The machine is drawn
by two Horses, the swingletrees d.d. being attached to a bar or beam
seven feet in length which allows it to project forward of the timber A
to a suitable distance. The use of the check chain f f is manifest
upon inspection. The height and distance of the handles D.D. must
be the same as in Ploughs or cultivators generally.
In using this instrument the ground is first prepared by ploughing,
and harrowing in the usual way when this has been done and the seed sown
the land is staked off at distances of a little upwards of seven feet. These
stakes serve as guides for the centre or plough part of the cultivator &
the teeth on the side timbers then form the ground into furrows of the
most convenient and suitable width for the advantageous growth of
the grain — I do not claim as my invention the individual
parts of this machine as I have described them. but what I do claim
is that general arrangement and combination of the whole which gives
to it that character by which it is distinguished from other cultiva
tors or harrows — A principal feature by which it is thus distin
guished is the reverse direction in which the triangle is drawn forward
& the fixture of the double mould board and its appendages in the
centre by which the lands are divided Witnesses
Thos Jones
Jo. Andrews John Prichard

650

Ex.
C.A.H.

In portfolio